(12) United States Patent
Furukawa et al.

(10) Patent No.: US 8,067,495 B2
(45) Date of Patent: Nov. 29, 2011

(54) THERMOPLASTIC ELASTOMER COMPOSITION AND GLASS PANEL MOLDING ASSEMBLY FOR A VEHICLE

(75) Inventors: Haruhiko Furukawa, Chiba (JP); Masakazu Irie, Chiba (JP)

(73) Assignee: Dow Corning Toray Company, Ltd., Chiyoda-ku, Tokyo (JP)

( * ) Notice: Subject to any disclaimer, the term of this patent is extended or adjusted under 35 U.S.C. 154(b) by 1086 days.

(21) Appl. No.: 11/910,558

(22) PCT Filed: Apr. 7, 2006

(86) PCT No.: PCT/JP2006/307896
§ 371 (c)(1),
(2), (4) Date: Oct. 3, 2007

(87) PCT Pub. No.: WO2006/109872
PCT Pub. Date: Oct. 19, 2006

(65) Prior Publication Data
US 2009/0269590 A1 Oct. 29, 2009

(30) Foreign Application Priority Data
Apr. 8, 2005 (JP) .................................. 2005-112905

(51) Int. Cl.
C08G 18/61 (2006.01)
C08G 18/63 (2006.01)
C08K 7/04 (2006.01)
C08K 5/06 (2006.01)
C08K 3/40 (2006.01)

(52) U.S. Cl. ........ 524/500; 524/284; 524/504; 525/100; 525/105; 428/426; 526/279

(58) Field of Classification Search .................. 524/318, 524/284, 500, 504; 525/100, 105; 526/279; 428/426
See application file for complete search history.

(56) References Cited

U.S. PATENT DOCUMENTS

| | | | |
|---|---|---|---|
| 4,341,879 | A | 7/1982 | Sugio et al. |
| 4,897,440 | A | 1/1990 | Lo |
| 5,484,848 | A | 1/1996 | Jadamus et al. |
| 6,395,810 | B1 | 5/2002 | Luitjes et al. |
| 2002/0142175 | A1* | 10/2002 | Hase et al. .................... 428/447 |
| 2003/0116750 | A1 | 6/2003 | Zhou et al. |
| 2006/0258793 | A1* | 11/2006 | Nonaka et al. ................ 524/495 |

FOREIGN PATENT DOCUMENTS

| | | |
|---|---|---|
| DE | 3445856 A1 | 6/1986 |
| EP | 0509535 A1 | 10/1992 |
| EP | 1312639 A1 | 5/2003 |
| JP | 0615185 | 2/1988 |
| JP | 10195274 | 7/1998 |
| JP | 10219077 | 8/1998 |
| JP | 2000109702 | 4/2000 |
| JP | 2004161946 A | 6/2004 |
| JP | 2004195717 | 7/2004 |
| JP | 2006057130 A | 3/2006 |
| JP | 2010007878 A | 1/2010 |
| WO | W08702684 A1 | 5/1987 |
| WO | W09204413 A1 | 3/1992 |
| WO | WO 2006/080560 * | 8/2006 |

OTHER PUBLICATIONS

English language Abstract of Japanese Publication No. 2004-161946 from the European Patent Office; 1 page, Jun. 10, 2010.
English language Abstract of Japanese Publication No. 2006-057130 from the European Patent Office; 1 page, Mar. 2, 2006.
English language Abstract of Japanese Publication No. 2010-007878 from the European Patent Office; 1 page, Jan. 14, 2010.
PCT International Search Report for PCT/JP2006/307896, Jun. 14, 2006, 4 pages.
English language abstract for DE3445856 extracted from espacenet.com, Jun. 20, 2008.
English language translation and abstract for JP10-195274 extracted from Searching PAJ, Jun. 23, 2008, pp. 22.
English language translation and abstract for JP10-219077 extracted from Searching PAJ, Jun. 23, 2008, pp. 24.
English language translation and abstract for JP2000-109702 extracted from Searching PAJ, Jun. 23, 2008, pp. 21.
English language translation and abstract for JP2004-195717 extracted from Searching PAJ, Jun. 20, 2008, pp. 34.
English language abstract for JP06-15185 extracted from Patents Abstracts of Japan, 1994.

* cited by examiner

Primary Examiner — James J Seidleck
Assistant Examiner — Deve E Valdez
(74) Attorney, Agent, or Firm — Howard & Howard Attorneys PLLC

(57) ABSTRACT

The present invention relates to a thermoplastic elastomer composition and a glass panel molding assembly for a vehicle. The thermoplastic elastomer composition comprising a polymer component (1) that comprises a styrene-type thermoplastic elastomer and a polyolefin-type polymer {except for the additives in item (5) below}, a non-aromatic-rubber softener (2), a higher fatty acid derivative (4), and at least one type of an additive (5) selected from (5-a) a vinyl polymer graft-olefin polymer, (5-b) a polyorganosiloxane cross-linked powder; and (5-c) a polyorganosiloxane graft-olefin polymer. And the glass panel molding assembly for a vehicle produced from the aforementioned composition.

14 Claims, 1 Drawing Sheet

THERMOPLASTIC ELASTOMER COMPOSITION AND GLASS PANEL MOLDING ASSEMBLY FOR A VEHICLE

RELATED APPLICATIONS

This application claims priority to and all the advantages of International Patent Application No. PCT/JP2006/307896, filed on Apr. 7, 2006, which claims priority to Japanese Patent Application No. JP 2005-112905, filed on Apr. 8, 2005.

1. Technical Field

The present invention relates to a thermoplastic elastomer composition and a glass panel molding assembly for a vehicle.

2. Background Art

Since thermoplastic elastomer compositions demonstrate plasticity when heated, they can be easily molded into a required shape when they are in a molten state. Furthermore, the molded products are suitable for re-melting and recycling, and, therefore, the aforementioned compositions find wide application for manufacturing various molded products. Among the aforementioned compositions, styrene-type thermoplastic elastomer compositions show excellent balance between softness and dynamic characteristics, and, therefore, these compositions find use in various fields for manufacturing automobile parts, road building and construction materials, electrical household appliances, sporting goods, miscellaneous goods, stationery, etc.

However, since the aforementioned thermoplastic elastomer compositions are generally characterized by high surface tackiness, they do not show sufficient mold-release properties required for molding. It was proposed to improve mold-release properties and to reduce tackiness by combining a thermoplastic elastomer composition with a fatty acid monoamide or a fatty acid substituted amide (e.g., see Japanese Unexamined Patent Application Publication (hereinafter Kokai) H10-195274 and Kokai H10-219077). However, when the molded parts with fatty acid monoamide or fatty acid substituted amide are used in the above method as exterior elements of hybrid vehicles, such external surface elements are subject to contamination and continue to produce a feel of tackiness by touch directly after molding.

Furthermore, as compared to parts molded from soft polyvinyl chloride resins, the surfaces of parts molded from thermoplastic elastomer compositions can be more easily suffered abrasions. In order to improve abrasion resistance, it was proposed to add silicone oils or silicone polymers to the composition. These additives may be combined with silicone powders to reduce exudation of the silicone (see Kokai 2000-109702). The above method does improve abrasion resistance and restricts exudation of the silicone, but the abrasion resistance appears to be insufficient for applications such as molded vehicle window frames that are used under very harsh conditions.

Normally a window glass panel of a vehicle is integrally connected to a resin-made or rubber-made window frame that is placed between the glass panel and a vehicle body. The window frame has a function to seal gaps between the glass panel and the vehicle body and, if necessary, may also have a decorative function. The frame material that has such a function is normally called "molding", "frame material", "gasket", "mold", etc.

Heretofore in the majority of cases, polyvinyl chloride was used as a material for such vehicle window-moldings because of its good moldability and abrasion resistance. Recently, however, for the benefits of environmental protection and treatment of production waste, it has been proposed to use preferably olefin-type or styrene-type thermoplastic elastomers, and compositions prepared therefrom (see Kokai 2004-195717 and Japanese Examined Patent Application Publication (hereinafter Kokoku) H06-15185).

A vehicle molding produced from a thermoplastic elastomer composition should satisfy the following requirements: (1) excellent abrasion resistance; (2) excellent aesthetic properties required for exterior design; (3) surface gloss suitable for vehicle moldings; and (4) strong adhesion to a glass panel. However, the existing thermoplastic elastomer composition can not simultaneously satisfy all of these requirements.

DISCLOSURE OF INVENTION

It is an object of the present invention to provide a thermoplastic elastomer composition that is characterized by excellent abrasion resistance and wherein the use of additives does not spoil the aesthetic appearance and does not produce a feeling of tackiness that may be caused by exudation. It is another object to provide a thermoplastic elastomer composition that satisfies the requirements of vehicle moldings such as automobile molding, i.e., satisfies environmental protection requirements, provides gloss, attractive appearance, adhesion, resistance to chemicals, abrasion resistance, moldability, dynamic characteristics, etc. Still another object is to provide a glass panel molding assembly for a vehicle that uses the aforementioned composition.

<1> The present invention provides a thermoplastic elastomer composition comprising: a polymer component (1) that comprises a styrene-type thermoplastic elastomer and a polyolefin-type polymer {except for the additives in item (5) below}; a non-aromatic rubber softener (2); a higher fatty acid derivative (4) in an amount of 0.01 to 10 parts by mass per 100 parts by mass of the polymer component; and at least one type of an additive (5) used in an amount of 1 to 20 parts by mass and selected from the following:

(5-a) a vinyl polymer graft-olefin polymer;
(5-b) a polyorganosiloxane cross-linked powder; and
(5-c) a polyorganosiloxane graft-olefin polymer.

<2> Furthermore, the present invention provides a glass panel molding assembly for a vehicle, wherein the aforementioned molding is integrally connected through a layer of an adhesive agent to a peripheral edge portion of a glass panel and wherein the molding is a product produced from the thermoplastic elastomer composition of item <1>.

The thermoplastic elastomer composition of the present invention is characterized by excellent surface abrasion resistance and is suitable for producing molded products that are free of tackiness and demonstrate excellent properties suitable for design. Furthermore, the thermoplastic elastomer composition of the invention is suitable for use as a material for vehicle moldings with properties not attainable with use of known thermoplastic elastomer compositions. The composition constitutes an excellent material for manufacturing molded products that, along with excellent gloss, good appearance, abrasion resistance, and good adhesive properties, also provides the same or higher resistance to chemicals and dynamic characteristics as conventional thermoplastic elastomers. Molding-glass assemblies for vehicles that are produced utilizing the aforementioned material demonstrate the same appearance as similar assemblies produced with the use of soft polyvinyl chloride resins. It goes without saying that in distinction to molding-glass assemblies formed from soft polyvinyl chloride resin, similar assemblies made with the use of the thermoplastic elastomer composition of the invention offer greater advantages regarding environmental protection and treatment of industrial wastes.

BEST MODE FOR CARRYING OUT THE INVENTION

Figure 1:
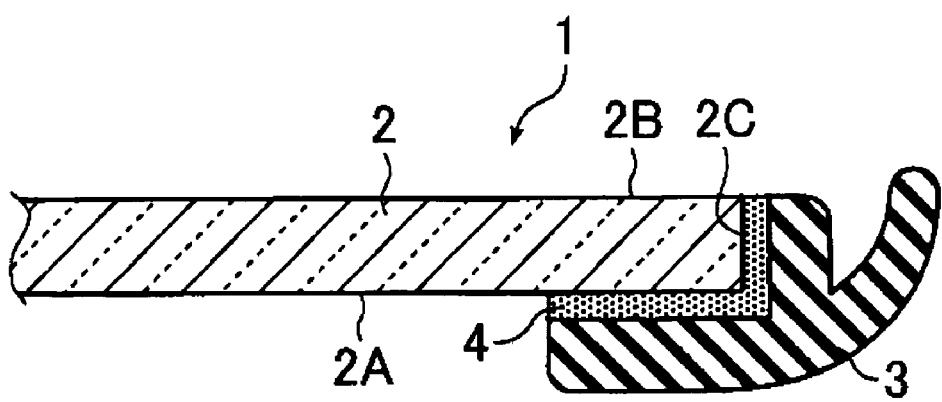
FIG. 1 is a sectional view that illustrates an example of a glass panel molding assembly produced with the use of a thermoplastic elastomer composition of the invention.

The polymer component (1) {except for the additives (5)} included in the thermoplastic elastomer composition of the invention comprises a styrene-type thermoplastic elastomer, a polyolefin-type polymer, and, if necessary, other polymers. This polymer component does not contain the below-described additives (5) and basically is composed from polymers that produce thermoplastic properties. The styrene-type thermoplastic elastomer and the polyolefin-type polymer are indispensable constituents of polymer component (1) and, if necessary, may be combined with other polymers. It is recommended that these other polymers be used in amounts smaller than the sum of styrene-type thermoplastic elastomer and polyolefin-type polymer. Such other polymers may be exemplified by but may not be limited to a thermoplastic polyurethane type polymer, thermoplastic polyester type polymer, thermoplastic polyamide type polymer, or similar polymers. Each of the above-mentioned polymers will be described separately in more detail.

[Styrene-type Thermoplastic Elastomer]

A styrene-type thermoplastic elastomer suitable for the present invention is comprised of a block copolymer that comprises a hard block (A) consisted essentially of styrene-type monomer units and a soft block (B) consisted essentially of conjugated diene-type monomer units and/or a product of hydrogenation of the aforementioned copolymer. The aforementioned soft block (B) may consist essentially of butadiene units and/or isoprene units. The aforementioned soft block (B) may be partially or completely hydrogenated.

The bonding structure of the aforementioned blocks may be linear-chain, branch-chain, or star-chain structure, or a combination of the above. The linear-chain structure is preferable. For example, this may be a tri-block copolymer such as A-B-A, a tetra-block copolymer such as A-B-A-B, a penta-block copolymer such as A-B-A-B-A, etc. Of these, most preferable is the A-B-A-type tri-block copolymer due to ease of production and softness and rubber elasticity of said styrene-type thermoplastic elastomer. It is understood that no special restrictions exit with regard to the bonding patterns, number of blocks, types of monomers, etc.

It is recommended that the hard block (A) should be contained in an amount of 5 to 60 mass %, preferably 20 to 50 mass % per mass of styrene-type thermoplastic elastomer. It is recommended that the soft block (B) should be contained in an amount of 40 to 95 mass %, preferably 50 to 80 mass % per mass of styrene-type thermoplastic elastomer.

From the viewpoint of improved thermal resistance, it is recommended that hard block A, which consist essentially of styrene-type monomer units, constitute a block that consists of a single polymer or a copolymer composed of styrene-type monomer units in an amount greater than or equal to 50 mass %, preferably greater than or equal to 70 mass %, in combination with other arbitrary components (such as those consisting e.g., conjugated diene-type monomer units). From the viewpoint of improved rubber elasticity, it is recommended that the soft block B, which consist essentially of conjugated diene-type monomer units, constitute a block that consists of a single polymer or a copolymer composed of conjugated diene-type monomer units in an amount greater than or equal to 50 mass % and preferably greater than or equal to 70 mass %, in combination with other arbitrary components (such as those consisting e.g., styrene-type monomer units).

From the view point of better balance between such characteristics as resistance to heat and hardness, rubber elasticity and other mechanical properties, it is recommended that the styrene-type thermoplastic elastomer as a whole contain 5 to 60 mass %, preferably 20 to 50 mass % of the styrene-type monomer units and 40 to 95 mass %, preferably 50 to 80 mass % of the conjugated diene-type monomer units.

In molecular chains of hard blocks A that consist essentially of styrene-type monomer units and in molecular chains of soft blocks B that consist essentially of conjugated diene-type monomer units, the aforementioned conjugated diene-type monomers and styrene-type monomers may have a random distribution, a tapered distribution (one wherein the monomer component is increased or decreased along the molecular chain), a partial block distribution, or any combinations of these. When there are two or more hard blocks A that consist essentially of styrene-type monomer units as their constitutional component, or two or more soft blocks B that consist essentially of conjugated diene-type monomer units as their constitutional component, the structures thereof may be the same or different.

The styrene-type monomer, which is one of the starting materials used in the production of styrene-type thermoplastic elastomer, may be exemplified by the following: styrene, α-methylstyrene, o-methylstyrene, m-methylstyrene, p-methylstyrene, p-t-butylstyrene, 2,4-dimethylstyrene, 2,4,6-trimethylstyrene, monofluorostyrene, monochlorostyrene, dichlorostyrene, etc. These monomers can be used individually or in combinations of two or more. Most preferable is styrene.

The conjugated diene-type monomer, which is another starting material used in the production of styrene-type thermoplastic elastomer, can be exemplified by the following: 1,3-butadiene, isoprene, 1,3-pentadiene, 2,3-dimethyl-1,3-butadiene, 1,3-hexadiene, etc. These monomers can be used individually or in combinations of two or more. Most preferable are 1,3-butadiene and isoprene, or combinations thereof. Soft block B that consists mainly of conjugated diene-type monomer units may have an arbitrary microstructure. For example, when soft block B is composed of both 1,3-butadiene and isoprene, in order to obtain an appropriate rubber elasticity at room temperature, it is recommended that the 1,2-microstructures (i.e., structural units formed as a result of addition polymerization between positions 1 and 2) constitute 20 to 50 mole %, preferably 25 to 45 mole %, of the butadiene block and it is preferable that the 1,4-microstructures (i.e., structural units are formed as a result of addition polymerization between positions 1 and 4) constitute 70 to 100 mole % of the isoprene unit.

From the viewpoint of improved weather-proof and heat-resistant properties of the thermoplastic elastomer composition, it is recommended that, based on the conjugated diene-type monomer, the carbon-carbon double bonds contained in the styrene-type thermoplastic elastomer be partially or completely hydrogenated. It is recommended that greater than or equal to 85 mole % and preferably greater than or equal to 90 mole % of the carbon-carbon double bonds be hydrogenated.

There are no special restrictions with regard to the number-average molecular weight of the styrene-type thermoplastic elastomer used in the invention, but it may be recommended that a value of greater than or equal to 100,000 and preferably greater than or equal to 150,000 be used. In the context of the present invention, the term "number-average molecular weight" means a molecular weight referenced to polystyrene and calculated on the basis of measurements obtained by means of gel-permeation chromatography (GPC). If the number-average weight is below 100,000, the molded products produced from the thermoplastic elastomer composition (hereinafter referred to merely as "products") may show insufficient thermal resistance that can be evaluated in terms of residual deformation under compression at 70° C. On the other hand, if the number-average molecular weight exceeds 500,000, this may impair moldability of the thermoplastic elastomer composition and may also dull the gloss on the surface of the products. Therefore, it is recommended to maintain the number-average molecular weight in the range of 150,000 to 370,000.

Several methods were proposed for the manufacture of a styrene-type thermoplastic elastomer. A typical method is disclosed, e.g., in Kokoku S 40-23798, wherein block polymerization is carried out in an inert medium using a lithium or a Ziegler catalyst. Methods of hydrogenation are also known. Hydrogenated block copolymers are commercially available.

[Polyolefin-type Polymer]

The polyolefin-type polymer that in the present invention constitutes polymer component (1) may be comprised of an olefin homopolymer or a copolymer. It is recommended that polyolefin-type polymer used in the composition should have a melt flow rate (JIS K7210) of 0.01 to 100 g/10 min., preferably 0.05 to 80 g/10 min., and even more preferably 0.1 to 60 g/10 min. This characteristic is measured at 190° C. if the melting peak temperature determined by means of a differential scanning calorimeter (DCS) is less than 130° C. and at 230° C. if the melting peak temperature is greater than or equal to 130° C. It is recommended that the modulus of elasticity in bending should be within the range of 10 to 2,500 MPa, preferably within the range of 100 to 2,000 MPa.

More specifically, the above-mentioned polymers can be exemplified by ethylene polymers, propylene polymers, or polyolefin-type polymers that are described below. The ethylene- and propylene-type polymers, especially propylene-type polymers, are preferable. These polymers can be used individually or as copolymers. In the case of copolymers, these can be random copolymers, block copolymers, or graft copolymers.

When the polyolefin-type polymer is copolymerized with an olefin or with a copolymerizable monomer other than an olefin, then the content of the aforementioned copolymerizable monomer other than olefin in the copolymer should less than 50 mole % and preferably less than 20 mole %. The aforementioned polymerizable monomers other than olefins may be represented by vinyl acetate, acrylic acid, acrylic acid ester, methacrylic acid, or methacrylic acid ester.

Polyolefin-type polymers that constitute polymer component (1) should exclude those polymers that constitute additives (5) which are described below. The vinyl-type polymer graft olefin polymer (5-a) and polyorganosiloxane graft olefin polymer (5-c), which are described below, constitute graft copolymers obtained by grafting a vinyl-type polymer or polyorganosiloxane to a polyolefin. When the polyolefin-type polymer that constitutes polymer component (1) is copolymerized with a copolymerizable monomer other than olefin, it is recommended that the copolymer be a random copolymer or a block copolymer.

The aforementioned polyolefin-type polymers may be those described below.

In the list below, those copolymers that are composed of the same monomer units and that have a higher content of respective monomers will be described first in subsequent examples.

The ethylene-type polymers can be exemplified by high-density, medium-density, or low-density polyethylene, ethylene-polyethylene copolymer, ethylene-polyethylene-1 copolymer, ethylene-hexene copolymer, ethylene-heptene copolymer, ethylene-octene copolymer, ethylene-4-methylpentene copolymer, ethylene-vinylacetate copolymer, ethylene-acrylic-acid copolymer, ethylene-acrylic-acid-ester copolymer, ethylene-methacrylic-acid copolymer, ethylene-methacrylic-ester copolymer, or similar copolymers with a high content of ethylene. The propylene-type polymers can be exemplified by polypropylene, propylene-ethylene copolymer, propylene-butene-1 copolymer, propolylene-ethylene-butene-1 copolymer, polypropylene-4-methylpentene-1 copolymer, or similar copolymers with a high content of propylene. Of these propylene-type polymers, most preferable are polypropylene and propylene-ethylene copolymers.

Other polyolefin-type polymers may be exemplified by polybutene-1, poly-4-methylpentene-1, etc.

[Polyphenylene Ether-Type Polymer]

In addition to the styrene-type thermoplastic elastomer and polyolefin-type polymers, a polyphenylene ether-type polymer also can be used as a polymer component of the present invention. In the thermoplastic elastomer composition, the aforementioned polyphenylene ether-type polymer is used for improving balance between heat-resistant and oil-proof properties. Known polyphenylene ether-type polymers can be used. It is recommended that the inherent viscosity of these polymers at 30° C. should be within the range of 0.08 to 0.90 g/dl, preferably within the range of 0.20 to 0.70 g/dl. If the inherent viscosity is less than 0.08 g/dl, the obtained product may have insufficient resistance to heat. If, on the other hand, the inherent viscosity exceeds 0.90 g/dl, this may impair moldability of the composition.

There are no special restrictions with regard to the methods that can be used for manufacturing the polyphenylene ether-type polymer, and conventional methods are applicable for this purpose. For example, this polymer can be produced by conducting oxidation polymerization between 2,6-dimethylphenol or a similar phenol (monomer) by means of oxygen in an atmosphere of inert gas such as nitrogen and with the use of a catalyst such as a complex of cuprous chloride or a similar copper salt with di-n-butylamine or a similar amine. The reaction is carried out in a mixed organic solvent composed of toluene, n-butanol, methanol, etc. The phenols composed of monomer units that form a polyphenylene ether-type polymer may be represented by the following: 2,6-dimethylphenol, 2,6-diethylphenol, 2,6-dibutylphenol, 2,6-dilaurylphenol, 2,6-dipropylphenol, 2,6-diphenylphenol, 2-methyl-6-ethylphenol, 2-methyl-6-cyclohexylphenol, 2-methyl-6-tolylphenol, 2-methyl-6-methoxyphenol, 2-methyl-6-butylphenol, 2,6-dimethoxyphenol, 2,3,6-trimethylphenol, 2,3,5,6-tetramethylphenol, 2,6-diethoxyphenol, etc. These phenols can be polymerized individually, or two or more phenols can be copolymerized.

Most preferable polyphenylene ether-type polymers can be exemplified by poly (2,6-dimethyl-1,4-phenylene ether), poly (2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether), poly(2-ethyl-6-propyl-1,4-phenylene ether), etc. Most preferable is poly(2,6-dimethyl-1,4-phenylene ether). The aforementioned polyphenylene ether-type polymers can be represented by copolymers wherein molecular chains partially contain repetitive units such as 2,3,6-trimethylphenol or similar alkyl tri-substituted phenol units. The aforementioned polyphenylene ether-type polymers can also be represented by copolymers obtained by graft polymerizing α-methylstyrene, vinyltoluene, chlorostyrene, or similar styrene-type monomers.

The contents of various polymers in the polymer component (1) may be the following: 5 to 150 parts by mass of polyolefin-type polymers and 0 to 150 parts by mass of polymers other than polyolefin-type polymers per 100 parts by mass of the styrene-type thermoplastic elastomer (however, the sum of polyolefin-type polymer and polymers other than polyolefin-type polymers should be less than or equal to 150 parts by mass). It is recommended that, aforementioned polymers other than polyolefin-type polymers in the polymer component (1) contain a polyphenylene ether-type polymer. In particular, it is recommended that aforementioned polymers other than polyolefin-type polymers in the polymer component (1) be substantially constituted by polyphenylene ether-type polymers. When the sum of polyolefin-type polymer and the aforementioned polymers other than polyolefin-type polymers exceeds 150 parts by mass, the products will not acquire the characteristics based on specific properties of the styrene-type thermoplastic elastomers.

In particular, it is recommended that the polymer component (1) be composed of 100 parts by mass of a styrene-type thermoplastic elastomer, 5 to 150 parts by mass of a polyolefin-type polymer, and 0 to 150 parts by mass of a polyphenylene ether-type polymer (however, the sum of the polyolefin-type polymer and the polyphenylene ether-type polymer should be less than or equal to 150 parts by mass). Preferably, this component may consist of 100 parts by mass a styrene-type thermoplastic elastomer, 20 to 100 parts by mass of a polyolefin-type polymer, and 0 to 100 parts by mass of a polyphenylene ether-type polymer (however, the sum of the polyolefin-type polymer and the polyphenylene ether-type polymer should be within the range of 30 to 120 parts by mass). When the above component contains a polyphenylene ether-type polymer, its content should be equal to or greater than 5 parts by mass, preferably equal to or greater than 20 parts by mass, per 100 parts by mass of the styrene-type thermoplastic elastomer.

If the content of the polyolefin-type polymer is less than 5 parts by mass per 100 parts by mass of the styrene-type thermoplastic elastomer, this will impair moldability in the thermoplastic elastomer composition and heat-resistant properties in the products. If, on the other hand, the content of the polyolefin-type polymer exceeds 150 parts by mass, this will increase hardness in the products, whereby they will lose their softness.

Furthermore, if the content of the polyphenylene ether-type polymer exceeds 150 parts by mass, this will increase hardness in the products, whereby they will lose their softness, and if the sum of the polyolefin-type polymer and the polyphenylene ether-type polymer exceeds 150 parts by mass, the products will be insufficient either in softness or in hardness.

[Non-Aromatic Rubber Softener (2)]

The thermoplastic elastomer composition of the invention contains a non-aromatic rubber softener (2). This component is used for imparting to the thermoplastic elastomer composition such softness and rubber elasticity. Any non-aromatic rubber softener known in the art can be used for this purpose. Most suitable are non-aromatic type mineral oils or synthetic softeners of low molecular weight. A non-aromatic rubber softener (2) can be used individually or in a mixture with two or more non-aromatic rubber softener of other types. Usually, mineral oil type rubber softening agents, which are known as process oils or extender oils used for softening, extending, process improving, etc., are mixtures of naphthene-type compounds and paraffin-type compounds. If among all carbon atoms present in the oil those that are contained in paraffin chains occupy equal to or greater than 50%, such process oil is called a paraffin-type process oil; if the amount of carbon atoms contained in naphthene rings occupy 30 to 45% of all carbon atoms, such oil is called a naphthene-type process oil; and if the amount of carbon atoms contained in aromatic rings occupy more than 30% of all carbon atoms, such a process oil is called an aromatic-type process oil.

Among the known process oils, the composition of the invention may incorporate both paraffin-type process oils and naphthene-type process oils. In addition to this, the composition may be combined with white oils, mineral oil, low-molecular-weight copolymers of ethylene and α-olefin (oligomer), paraffin wax, liquid paraffin, or the like. Most preferable are paraffin-type process oils and/or naphthene-type process oils, especially paraffin-type process oils. Among the paraffin-type process oils, most preferable are those that contain a smaller amount of aromatic-ring components. The use of an aromatic rubber softener such as an aromatic process oil is not recommended since it damages hard blocks A contained in the styrene-type thermoplastic elastomer (a) and composed of styrene-type monomer units, whereby the thermoplastic elastomer composition becomes insufficient in mechanical strength and rubber elasticity.

It is recommended that the non-aromatic rubber softener (2) should be used in an amount of 10 to 200 parts by mass, preferably 30 to 150 parts by mass, per 100 parts by mass of the polymer component (1). If it is contained in an amount less than 10 parts by mass per 100 parts by mass of the polymer component (1), this may impair moldability and processing of the thermoplastic elastomer composition; if, on the other hand, it is contained in an amount exceeding 200 parts by mass, this may impair mechanical strength of the products and may cause exudation of the non-aromatic-rubber softener. Furthermore, when a thermoplastic elastomer composition does not contain a polyphenylene ether-type polymer or contains only a relatively small amount thereof (e.g., in the case of less than 20 parts by mass per 100 parts by mass of the styrene-type thermoplastic elastomer), it is recommended to provide a relatively high content of the non-aromatic-rubber softener (2) e.g., 30 to 200 parts by mass, preferably 60 to 150 parts by mass per 100 parts by mass of the polymer component (1).

[Inorganic Filler (3)]

If necessary, the styrene-type thermoplastic elastomer of the present invention may further comprise an inorganic filler (3). The inorganic filler improves thermal resistance, weather resistance, and other physical properties of the products while an increase in the amount of the filler reduces the cost of the product. Aforementioned inorganic filler (3) may be comprised of calcium carbonate, talc, magnesium hydroxide, aluminum hydroxide, mica, clay, barium sulfate, natural silicic acid, synthetic silicic acid (white carbon), titanium oxide, carbon black, etc. These fillers can be used individually or in a mixture of two or more. Inorganic fillers (3) can be used in an untreated state or can be preliminarily surface-treated with fatty acids, silane couplings, etc. For improving appearance, strength, cost reduction, and other useful properties, the thermoplastic elastomer composition of the invention can also be combined with calcium carbonate and talc, and especially with ground calcium carbonate.

When the inorganic filler (3) is used, it is recommended to add it in an amount of 5 to 250 parts by mass, preferably 5 to 150 parts by mass per 100 parts by mass of the polymer component (1). If the added amount of the filler exceeds 250 parts by mass, this may impair mechanical strength of the thermoplastic elastomer composition and may increase hardness, resulting in loss of desirable softness. When the thermoplastic elastomer composition contains a relatively large amount of the polyphenylene ether-type polymer (i.e., equal to or greater than 20 parts by mass per 100 parts by mass of the styrene-type elastomer), it is recommended to add a relatively large amount of inorganic filler (3), in the range of 30 to 150 parts by mass per 100 parts by mass of the polymer component (1).

[Higher Fatty Acid Derivatives (4)]

The higher fatty acid derivatives (4) used in the thermoplastic elastomer composition of the invention migrate to the surface of the product produced from the thermoplastic elastomer composition of the invention and improve resistance of the product to rubbing. The higher fatty acid derivatives (4) may be comprised of derivatives of fatty acids that contain 8 to 30 carbon atoms (except for carbon atoms of carbonyl groups). In particular, these fatty acids are referred to as "higher fatty acids." The higher fatty acids may, in turn, be in the form of higher unsaturated fatty acids that contain unsaturated groups or saturated fatty acids. Most preferable of the higher fatty acids are those that contain 12 to 20 carbon atoms, except for carbon atoms of carbonyl groups. Specific examples of such higher fatty acids are the following: caprylic acid, lauric acid, myristic acid, palmitic acid, stearic acid, behenic acid, etc. Derivatives of the higher fatty acids may be comprised of higher fatty acids, metal salts of higher fatty acids, higher fatty acid amides, higher fatty acid esters, etc. From the viewpoint of better abrasion resistance, it is better to use higher fatty acid amides, or higher fatty acid esters, of which higher fatty acid amides are most preferable. Such higher fatty acid amides can be represented by amides as products of a reaction between alkylamine or alkylenediamine, or similar amine, and a higher fatty acid.

The appropriate higher fatty acid amides can be represented, e.g., by the following compounds: amide capriates, amide laurates, amide myristates, amide palmitates, amide stearates, arachidic acid amides (eicosanic acid amides), behenic acid amides (docosanoic acid amides), or similar higher saturated fatty acid amides; amide oleate, gadoleic acid amide (9-eicosanic acid amides), erucic acid amide (docosanoic acid amide), or similar unsaturated higher fatty acid amide; N,N'-ethylene bis(stearoamide), or a similar amides as products of a reaction between diamine and a higher fatty acid. The appropriate higher fatty acid esters may be represented by butyl stearate, monoglyceride stearate, ethyleneglycol monostearate, stearyl stearate, etc.

In order to provide migration to the surface of the product and to impart abrasion resistance, it is recommended that the higher fatty acid derivatives (4) have a melting point equal to or less than 200° C., preferably within the range of 50 to 150° C. The most preferable higher fatty acid derivatives are those having melting points between 60 and 150° C. If the higher fatty acid derivatives (4) have high volatility, their effect will gradually diminish. Therefore, it is recommended that the boiling point of said higher fatty acid should be equal to or greater than 200° C.

It is recommended the fatty acid derivatives (4) should be used in an amount of 0.01 to 10 parts by mass per 100 parts by mass of the polymer component (1). If they are used in an amount less than 0.01 parts by mass, the effect of abrasion-proof properties on the surfaces of the products may be insufficient. If, on the other hand, the content of the fatty acid derivatives exceeds 10 parts by mass, exudation to the surface may be significant. This may spoil the appearance and may reduce the mechanical strength of the product.

[Additives (5)]

The thermoplastic elastomer composition of the invention may incorporate at least one type of an additive (5) selected from the below-listed additives (5-a), (5-b), and (5-c):

(5-a) a vinyl polymer graft-olefin polymer;
(5-b) a polyorganosiloxane cross-linked powder; and
(5-c) a polyorganosiloxane graft-olefin polymer.

Addition of these additives will appropriately restrict exudation of the higher fatty acid derivatives (4) to the surface of the products and will maintain migration at the acceptable level. More specifically, provision of these additives restricts exudation of the higher fatty acid derivatives (4) to the surface of the product directly after molding and thus restricts contamination of the surface and development of the feel of tackiness. The additives (5-a) through (5-c) can be used individually or in combinations of two or more types. For example, the combination may be composed of the vinyl polymer graft-olefin polymer (5-a) and the polyorganosiloxane cross-linked powder (5-b). Such a combination will more effectively prevent excessive exudation of the higher fatty acid derivatives (4).

Each component of the additive (5) will now be described in more detail. The vinyl polymer graft-olefin polymer (5-a) is a polymer obtained by grafting a vinyl-type polymer to a propylene-type polymer or a similar olefin polymer. An olefin polymer, which is a main-chain polymer, produces an effect of compatibility with a styrene-type thermoplastic elastomer component, while the vinyl-type polymer, which is a branched polymer, retains the higher fatty acid derivative (4) due to its polarity and gradually diffuses it.

The polyolefin-type polymers may be represented by a polyolefin, polypropylene, an ethylene-propylene copolymer, a copolymer of ethylene and an α-olefin having more than four carbon atoms, a copolymer of α-olefin and a vinyl monomer, an ethylene-type copolymer rubber, a diene-type rubber, or a polyisoprene rubber, etc. These polymers can be used individually or in combinations of two or more.

The vinyl-type monomers that are included in vinyl-type polymers (5-a) may be comprised of monomers that contain aromatic rings, cyano groups, epoxy groups, ester units, oxyalkylene chains, hydroxyl groups, or similar units that possess polarity. The aforementioned monomers may be exemplified by those given below:

styrene, methylstyrene, chlorostyrene, α-methylstyrene, α-ethylstyrene, or a similar styrene-type monomer; a acrylic acid or a methacrylic acid such as (α,β-unsaturated carboxylic acid; methylacrylate, ethylacrylate, or similar alkylacrylates that constitute an ester of alkyl alcohols with 1 to 20 carbon atoms and acrylic acid; methylmethacrylate, ethylmethacrylate, or similar alkylmethacrylates that constitute an ester of alkyl alcohols with 1 to 20 carbon atoms and methacrylic acid; acrylonitrile, methacrylonitrile, or a similar vinyl cyanide compound; vinyl acetate, vinyl propionate, or a similar vinyl ester; polyethyleneglycol monoacrylate, polytetramethyleneglycol acrylate, or a similar monoester of a long-chain glycol with a molecular weight of 80 to 6000 and a acrylic acid; polyethyleneglycol monomethacrylate, polytetramethyleneglycol methacrylate, or a similar monoester of a long-chain glycol with a molecular weight of 80 to 6000 and a methacrylic acid; glycidylacrylate, glycidylmethacrylate, or a similar unsaturated epoxy compound; 2-hydroxyethylacrylate, 2-hydroxypropylacrylate, 3-hydroxypropylacrylate, or a similar hydroxyalkylacrylate that contains a hydroxyalkyl group with 2 to 6 carbon atoms; 2-hydroxyethylmethacrylate, 2-hydroxypropylmethacrylate, 3-hydroxypropylmethacrylate, or a similar hydroxyalkylmethacrylate that contains a hydroxyalkyl group with 2 to 6 carbon atoms; 3-hydroxy-1-propene, 4-hydroxy-1-propene, cis-1,4-dihydroxy-2-butene, chrotonic acid 2-hydroxyethyl, or a similar vinyl-type monomer that contains a hydroxy group; maleic acid, fumaric acid, unhydrous maleic acid, maleimide, etc.

The aforementioned monomers can be used individually or in a combination of two or more. It is preferable to use a monomer of at least one type selected from the following group: acrylic acid, methacrylic acid, glycidyl acrylate, glycidyl methacrylate, or a vinyl monomer that contains a hydroxy group (especially, a hydroxyalkyl acrylate or a hydroxyalkyl methacrylate). Preferably, these can be used with styrene, vinyl cyanide, the aforementioned alkylacrylate, or the aforementioned alkylmethacrylate in combination. An appropriate graft-copolymer can be produced by a conventional method such as a chain-transfer method, ionization radiation, or the like.

The polyorganosiloxane cross-linked powder (5-b) is capable of absorbing, retaining, and gradually diffusing the higher fatty acid derivatives. This powder is not dissolved even during molding of the thermoplastic elastomer composition and is preserved in its initial powdered form in the products. In particular, the polyorganosiloxane cross-linked powder (5-b) does not migrate to the surface of the product like a silicone gum or a conventional lubricating agent. It is recommended to use the polyorganosiloxane cross-linked powder (5-b) in a finely powdered form. The powder particles may be spherical or irregular in shape. The spherical particles are preferable. There are no special restrictions with regard to the size of the grains, but in order to be suitable for thin and delicate products and in order not to spoil the appearance by coarse grains, it is recommended that the particle size be within the range of 0.1 to 200 μm, preferably of 0.1 to 100 μm. Furthermore, the polyorganosiloxane cross-linked powder (5-b) may be in a gel-like form, rubber-like form, or semicured resin form. In order to obtain a better effect in preventing exudation of the higher fatty acid derivative (4), the use of the rubber-like form is preferable.

The polyorganosiloxane cross-linked powder (5-b) can be prepared, e.g., by any of the methods from Method 1 to Method 5, of which Methods 2 to 5 are recommended, and Method 5 is most preferable since it allows simple control of particle dimensions and shapes.
(Method 1) Cross-linked polyorganosiloxane is ground;
(Method 2) Cross-linkable polyorganosiloxane composition is cross-linked;
(Method 3) Cross-linkable polyorganosiloxane composition is cross-linked in a state dispersed in water;
(Method 4) Cross-linkable polyorganosiloxane composition that contains a surface-active agent is cross-linked in a powdered state;
(Method 5) Cross-linkable polyorganosiloxane composition is cross-linked in a state dispersed in an aqueous solution of a surface-active agent, and then the water is removed.

The aforementioned cross-linked polyorganosiloxane powder obtained by the aforementioned method can be cross-linked by an addition-reaction curing mechanism, condensation-reaction curing mechanism, or a radical-reaction curing mechanism carried out with the use an organic peroxide. Among these, polyorganosiloxane powder cross-linked by the addition-reaction mechanism and the condensation-reaction mechanism are preferable. A proper polyorganosiloxane cross-linked powder is commercially produced by Dow Corning Toray Co., Ltd. under the trademark of Torefil-E Powder.

The polyorganosiloxane graft-olefin polymer (5-c) can be obtained by grafting a polyorganosiloxane to a ethylene-type polymer, a propylene-type polymer, or a similar olefin type polymer. For example, the process may be carried out with the use of an olefin polymer and a high-molecular-weight polyorganosiloxane that contains an alkenyl group, with or without the presence of an organic peroxide, with heating and mixing. The olefin polymer used in the additive (5-c) is the same one used in the aforementioned additive (5-a).

The organopolysiloxane that contains an alkenyl group may be exemplified by the polyorganosiloxane represented by the formula given below.

Average Unit Formula: $R^1_a R^2_b SiO_{(4-a-b)/2}$ 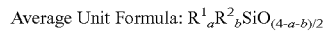

wherein $R^1$ is a univalent hydrocarbon or a halogen-substituted univalent hydrocarbon; and "a" and "b" are positive numbers that satisfy the following conditions: $0.0001 \leq a/b \leq 0.1000$ and $1.8 \leq (a+b) \leq 2.2$. The univalent hydrocarbon can be represented by methyl, ethyl, propyl or a similar alkyl group; cyclopentyl, cyclohexyl, or a similar cycloalkyl group; phenyl, xylyl, or a similar aryl group; and benzyl, phenethyl, 3-phenylpropyl, or a similar aralkyl group. The halogen-substituted univalent hydrocarbon can be represented by a 3,3,3-trifluoropropyl group or a 3-chloropropyl group. In the above formula, $R^2$ may be exemplified by a vinyl, propenyl, butenyl, pentenyl, hexenyl, or a decenyl group, of which vinyl and hexenyl groups are most preferable.

An appropriate polyorganosiloxane should have a viscosity at 25° C. of no less than 1,000,000 mPa·s, more preferably higher than 5,000,000 mPa·s, and most preferably higher than 10,000,000 mPa·s. The polyorganosiloxane graft olefin polymer of the aforementioned type is commercially produced by Dow Corning Toray Co., Ltd. under the trademark of Silicone Concentrate Series BY 27-2XX.

The total sum of constituents (5-a) to (5-c) of the additive (5) should be added to the composition in an amount of 0.1 to 20 parts by mass per 100 parts by mass of the polymer (1). If they are added in an amount of less than 0.1 parts by mass, it will be difficult to provide a sufficient effect in preventing exudation of the higher fatty derivatives and tackiness on the surface of products. Adding this component in an amount exceeding 20 parts by mass is undesirable as this will reduce mechanical strength of the thermoplastic elastomer composition.

[Other Components]

In addition to the components mentioned above, the thermoplastic elastomer composition of the invention may be compounded with a poly-α-methylstyrene or other reinforcement resins, flame retardants, antioxidants, thermal stabilizers, ultraviolet-ray absorbers, optical stabilizers, charge inhibitors, mold-release agents, antifoaming agents, pigments, dyes, sensitizers, etc. These components should be added in conventional quantities.

[Preparation of Thermoplastic Elastomer Composition]

The thermoplastic elastomer composition of the invention can be prepared in a conventional manner by mechanical melt mixing of the aforementioned components. Equipment that can be used for melt mixing may be comprised of a single-screw extruder, twin-screw extruder, Brabender plastograph, Bambury mixer, kneader-blender, roll mill, or the like. Melt mixing can be carried out at a temperature of 145 to 300° C.

It is recommended that the thermoplastic elastomer composition of the invention should have a melt flow rate in the range of 0.5 to 10 g/min (at 230° C. and 2.16 kgf). If the melt flow rate is less than 0.5 g/min, short-shot problems may occur in molding on large glass panels. On the other hand, if the flow rate exceeds 10 g/10 min, this may create an extreme flow resulting in the formation of voids and pockets in the mold and burrs on the product that will spoil its appearance. Furthermore, this will impair mechanical properties of the product.

[Molding of the Thermoplastic Elastomer Composition]

The thermoplastic elastomer composition of the invention is a molding material suitable for any melt-molding method such as injection molding, extrusion molding, press molding, or the like. The most suitable methods are injection molding and extrusion molding. There are no special restrictions with regard to molding conditions. Normally, melting with kneading should be carried out at 140 to 300° C. (but the temperature should not exceed the point of decomposition of any components of the composition), and the molten material is then injected under pressure into a mold or extruder. The preferable knead and melting temperature is in the range of 160 to 240° C.

It is recommended that the hardness of the composition, in terms of Shore A scale, be within the range of 40 to 95, preferably 50 to 90. It is also recommended that the tensile strength of the composition have an average value equal to or greater than 5 MPa and more preferably equal to or greater than 7 MPa, and that the 100% modulus of elasticity be equal to or greater than 2 MPa. It is also recommended that the elongation at stretching be equal to or greater than 400%, the tear strength be equal to or greater than 30 N/mm, and the permanent deformation is less than 50% in the case of 25% compression at 70° C. for 22 hours. In order to obtain the feel of integrity with the body of a vehicle, it is recommended that the surface gloss be equal to or greater than 10, preferably equal to or greater than 15. Higher surface gloss will be preferable as long as the vehicle window-molding satisfies the requirements of mechanical characteristics. Furthermore, it is recommended that the resistance to chemicals provide a mass change rate equal to or less than 50% and the adhesion strength to a glass panel be equal to or greater than 100 N/25 mm.

[Molding-Glass Panel Assembly]

An example of a glass panel molding assembly of the invention for a vehicle is shown in FIG. 1 as a cross-sectional view of the assembly. In this drawing, reference numeral 1 designates a glass panel molding assembly, reference numeral 2 designates a glass panel, 2A designates exterior surface of the glass panel, 2B designates interior surface of the glass panel, 2C designates the end face of the glass panel, 3 designates a molding, and 4 designates an adhesive layer. The glass panel molding assembly 1 comprises an integral unit formed by bonding the molding 3 to the end face 2C and to exterior surface 2A of glass panel 2 through the adhesive layer 4.

[Manufacturing of the Glass Panel Molding Assembly]

The shape of the molding produced from the thermoplastic elastomer composition of the invention is determined by the function and design requirements of the assembly. For example, apart from the shape shown in FIG. 1, the molding 3 can be attached via the adhesive layer 4 only to exterior surface 2A of the glass panel, or to interior surface 2B, exterior surface 2A, and the end face 2C. Furthermore, the molding may have the same cross section along the entire edge of the glass panel, or the cross section of the molding may be different in various positions on the panel edge. The molding can be integrally connected to the glass panel along the entire periphery or only in specified areas of the panel periphery, or can be integrated only partially.

The thermoplastic elastomer composition of the invention can be formed into a molding by any conventional method, i.e., by injection molding, extrusion, or by any other forming method.

When the glass panel molding assembly is produced by injection molding, for example, the following procedure is preferable; the glass panel is inserted into a mold having a working chamber essentially of the same shape as the shape of the molding, the mold is closed so that a sealed working cavity is formed between the walls of the chamber and the edge portion of the glass panel, the thermoplastic elastomer composition is injected into the aforementioned working cavity, and after the composition cures, the molding is integrally attached to the periphery of the glass panel. In this case, prior to insertion of the glass panel into the mold, an adhesive agent, that after molding will form the aforementioned adhesive layer, is applied onto the edge of the glass panel intended for connection to the molding.

Furthermore, the thermoplastic elastomer composition can be injection-molded to form a molding in the form of a loop that can be bonded to the entire perimeter of the glass panel edge or in the form for bonding to a part of the glass panel perimeter, e.g., in a U-shape configuration that will be bonded to three sides of the glass panel periphery. In this case, the molding is pressed and bonded to the glass panel edges thus forming an integral unit. Prior to pressing the molding to the edges of the glass panel, the edges may be covered with a double-sided adhesive tape or coated with an adhesive agent, or alternatively, prior to bonding of the molding the adhesive agent can be applied onto the surface of the molding that facing to the glass panel.

In accordance with another method that is known as an extrusion forming method, the thermoplastic elastomer composition is extruded to a required shape through a die that has substantially the same cross section as the molding. In this case, (a) the product can be extruded into a separate product which is applied onto the glass panel directly after extrusion and integrated therewith by pressing the molding to the glass panel edged, or (b) the molding can be applied onto the glass panel edges and integrated therewith by extruding the product directly onto the glass panel edges from the extrusion die.

[Glass Panel]

A glass panel used for manufacturing the glass panel molding assembly of the invention may have different structures and may comprise, e.g., a laminated structure composed of single inorganic glass plates interposed one onto the other through intermediate films, a reinforced glass panel produced by reinforcement treatment, or a transparent resin plate known as organic glass.

In the area where the adhesive agent layer is formed, the glass panel can be coated with a shading layer of a baked ceramic paste. This shading layer conceals the adhesive layer from the outer side of the vehicle and protects it from ultraviolet rays. When a thermoplastic elastomer composition is used, attachment to the vehicle body is normally performed by means of a urethane-type adhesive, and the use of the shading baked ceramic paste will reduce the effect of ultraviolet rays on the urethane-type adhesive agent.

[Adhesive Agent]

An adhesive agent is used in the manufacture of the glass panel molding assembly of the invention for improving adhesion of the molding to the glass panel. The adhesive agent used for the purposes of the invention should be the one that provides reliable attachment to the glass plate. This may be a composition that consists of an anhydrous maleic-acid-modified propylene-1-butene copolymer, a polypropylene chloride modified with an anhydrous maleic acid, and an epoxy silane; a composition that contains a propylene chloride, an epoxy-containing compound, and a silane coupling agent; or other similar compositions.

For example, the adhesive agent can be prepared by dissolving a polypropylene chloride and trimethylolpropane triglycidyl ether in xylene, adding 3-aminopropyl trimethoxysilane to the obtained solution, and stirring the components.

When the adhesive agent is liquid, it develops an adhesive force after drying even if it was applied onto the glass plate in a very thin layer. In order to form a 10 to 20 μm-thick film after drying, it is recommended that the adhesive agent should be applied in an amount of 15 g/m$^3$ in terms of resin.

Practical Examples

The invention will be further described in detail with reference to practical and comparative examples.

Given below are contents and designations of the materials which were used as components of the composition:
(1-a) Styrene-type Thermoplastic Elastomer
  SBC-1: Product of Kuraray Co., Ltd., "Septon 4055", hydrogenated A-B-A type styrene-(isoprene-butadiene) copolymer that contains 30 mass % of component (A) polystyrene and 70 mass % of component (B) poly(isoprene-butadiene); number-average molecular weight: 227,000; degree of hydrogenation: equal to or greater than 90%;
(1-c) Polyolefin-type Polymer:
  PP: Product of Idemitsu Petrochemical Co., Ltd. "PP: J-700GP", polypropylene resin, melt flow rate 8 g/10 min (at 230° C. and 2.16 kgf);
(1-d) Polyphenylene-Ether Type Polymer:
  PPE: Product of Mitsubishi Engineering Plastic Co., Ltd., "PPE Polymer-YPX-100L", poly(2,6-dimethyl-1,4-phenylene ether), kinematic inherent viscosity: 0.47 dl/g;
(2) Non-Aromatic Rubber Softener:
  OIL: Product of Idemitsu Kosan Co., Ltd., "Diana Process PW-90", paraffin type process oil, less than or equal to 0.1 mass % content of aromatic components.
(3) Inorganic Filler:
  Calcium Bicarbonate: Shiroishi Kogyo Co., Ltd., ground calcium bicarbonate, "Whiton P-10";
  Carbon MB: Product of Hekisa Chemical Co., Ltd., Carbon Black 40 mass % content of Master Batch, polyolefin grade;
(4) Higher Fatty Acid Derivative:
  Oleic acid amide (Wako Junyaku Kogyo Co., Ltd.; Production Reagent Grade), melt point: 76° C.;
  Stearyl Stearate Product of Kao Corporation, "Exeparl SS", melt point: 56° C.~66° C.
(5) Additives:
(5-a) Vinyl Polymer Graft-Olefin Polymer (Copolymer 1):
  2500 g of pure water were placed into a stainless-steel autoclave having a 5 liter capacity, and 2.5 g of polyvinyl alcohol were added to the water to form a suspension. Following this, 700 g of an ethylene-propylene copolymer (the product of Nippon Synthetic Rubber Co., Ltd., "EPO7P") were added, stirred, and dispersed in the suspension. Separately, 1.5 g of a radical polymerization initiator in the form of 3,5,5-trimethylhexanoyl peroxide and 9 g of a radical-polymerizable organic peroxide compound in the form of t-butylperoxymethacryloyl oxyethylcarbonate were dissolved in 100 g of a 2-hydroxypropyl methacrylate, 100 g of n-butyl acrylate, and 100 g of styrene as a vinyl monomer. The obtained solution was placed into the aforementioned autoclave and stirred.

The temperature in the autoclave was raised to 60 to 65° C., and the content was stirred for 3 hours, whereby the ethylene-propylene copolymer was impregnated with the radical polymerization initiator, radical-polymerizable organic peroxide, and the vinyl monomer. After verification of the fact that the total amount of absorbed radical polymerization initiator, radical-polymerizable organic peroxide, and the vinyl monomer became greater than or equal to 30 mass %, the temperature was raised to 70 to 75° C., and the product was retained at this temperature for 6 hours until completion of polymerization. After washing with water and drying, a grafting precursor was obtained.

Graft Copolymer 1 was produced by extruding the obtained grafting precursor through a twin screw extruder (from W&P Company, model ZSK-25) at 180° C. and subjecting it to a grafting reaction.
(5-b) Polyorganosiloxane Cross-linked Powder (Silicone Powder):
  The product of Dow Corning Toray Co., Ltd., "Torefil E Powder E-500"; average particle size: 5 microns;
(5-c) Polyorganosiloxane Graft-olefin Polymer (Copolymer 2):
  The product of Dow Corning Toray Co., Ltd., "Silicone Concentrate BY27-201", diorganopolysiloxane graft polypropylene resin; silicone content: 40 wt. %;
Silicone Oil:
  The product of Dow Corning Toray Co., Ltd.; "SH200, 10,000 CS"; viscosity: 10,000 mPa·s; weight-average molecular weight: 65,000.

Practical Examples and Comparative Examples (1) Compositions shown in Table 1 and prepared by premixing the composition components in indicated proportions were fed to a twin screw extruder (the product of W & P Company, Model ZSK-25", and after melting and kneading at rotation speed of the screw of 300 rpm, were extruded into strands which were then cut into pellets of the thermoplastic elastomer composition. (2) The pellets obtained as described above in Item (1) were used for producing a flat plate (A) having dimensions of 120 mm (length)×120 mm (width)×2 mm (thickness) and a flat plate (B) having dimensions of 90 mm (length)×90 mm (width)×4 mm (thickness). The plates were produced by using the pellets in an injection molding machine (the product of Ergotech Co.: clamping force of 100 tones, melt temperature of 180 to 200° C., mold temperature of 40° C. The mold surface roughness corresponded to #400. A flat plate C having dimensions of 100 mm (length)×50 mm (width) and 2 mm (thickness) was then produced in an injection molding machine (the product of Niigata Engineering Co., Ltd.) by using the same pellets that were prepared for the manufacture of plates A and B (clamping force of 300 tones, melt temperature of 180 to 200° C., mold temperature of 40° C.). The mold surface roughness corresponded to #400.

Described below are methods that were used for evaluating the above-described flat plates and samples cut from these plates with regard to such properties as hardness, tensile strength, 100% modulus of elasticity, elongation, tearing strength, permanent deformation at compression, surface appearance, surface abrasion-proof properties, resistance to chemicals, surface gloss prior to and after rubbing tests, and visual inspection of the surface after rubbing. Adhesive properties were evaluated, as described below, by using a laminate structure obtained by injection molding the composition on the surface of a glass plate having dimensions of 100 mm (length)×50 mm (width)×5 mm (thickness). The results of the evaluations are shown in Table 1 and Table 2.

(Methods of Testing, Measuring, and Evaluating)

Described below are the methods used for testing, measuring, and evaluating the properties of the thermoplastic elastomer composition (hardness, tensile strength, 100% modulus of elasticity, elongation, tearing strength, permanent deformation at compression, surface appearance, surface abrasion-proof properties, resistance to chemicals, surface gloss, surface rubbing resistance, and adhesive properties.

(1) Hardness:

This property was measured by stamping out from the aforementioned flat plate A having dimensions of 120 mm (length)×120 mm (width)×2 mm (thickness) dumbbell-type specimens (rubber specimens No. 3 according to JIS K6251), and then hardness was measured on the obtained specimens by the method specified in JIS K6253 "Methods of Testing Hardness of Vulcanized and Thermoplastic Rubbers" with the use of a type-A durometer of Shimazu Seisakusho Co., Ltd.

(2) Tensile Strength and Elongation:

These properties were measured on the aforementioned dumbbell-type specimens obtained from flat plate A in accordance with the provisions of JIS K6251 (Methods for Testing Tensile Strength of Vulcanized Rubbers) by using an autograph of Shimazu Seisakusho Co., Ltd. Tensile strength at the time of 100% elongation was recorded as 100% modulus of elasticity.

(3) Tear Strength:

Crescent-shaped specimens according to JIS $K_{6252}$ (Methods for Testing Tear Strength of Vulcanized Rubbers) were produced from aforementioned flat plates A, and the tear strength was measured on an autograph of Shimazu Seisakusho Co., Ltd. according to JIS K6252.

(4) Permanent Deformation at Compression:

Three disk-shaped specimens (diameter of 29 mm) stamped out from aforementioned flat plate B having dimensions of 90 mm (length)×90 mm (width)×4 mm (thickness) were stacked one onto the other, and then measurement of permanent deformation at compression was carried out according to JIS K6262 (Method for Testing Parmanent Deformation of Vulcanized and Thermoplastic Rubbers) in 22 hours after 25% compression at 70° C. for 22 hours.

(5) Surface Abrasion-proof Properties:

With a thumb inserted into a cotton glove, the surface of aforementioned flat plate A was rubbed five times, and then the surface was visually observed for abrasion. The following criteria were used: no abrasion—"5"; slight abrasion—"4"; abrasion easily observed—"3"; abrasion clearly observed—"2"; significant abrasion—"1".

(6) Surface Appearance:

After the plate (A) was molded, it was retained for 24 hours at room temperature and then evaluated visually and by touch on the subject of the presence of any unusual external defects, and especially products of exudation (inspection after molding). Furthermore, after being held for 4 weeks in an oven at 30° C., the plate (A) was removed from the oven, held for 24 hours at room temperature, and then observed visually and by touch on the subject of the presence of any unusual external defects, and especially products of exudation (inspection after ageing). The following criteria were used for the evaluation: no products of exudation were observed on the plate surface—"5"; products of exudation are not visually seen but slight sensation of tackiness is felt by touch due to the presence of the products of exudation—"4"; products of exudation are not visually seen but sensation of tackiness is felt by touch due to the presence of the products of exudation—"3"; products of exudation are not visually seen but products of exudation are definitely sensed by touching the plate surface—"2"; a significant amount of products of exudation is observed and felt by touch on the plate surface—"1".

(7) Resistance to Chemicals:

30 mm×30 mm samples were cut from aforementioned flat plate C having dimensions of 100 mm (length)×50 mm (width)×2 mm (thickness), and then according to JIS K7114 (Method for Testing Plastics by Immersion into Liquid Chemicals), the samples were tested in a constant-temperature oven DK400T (product of Yamato Science Co., Ltd.) by holding them in an immersed state for 4 hours with heating to a test temperature of 70° C.±2° C. in a car wax (the product of SOFT Co., Inc., "Pearl Metallic" (solid form); Carnauba wax, silicone oil, 75 mass % petroleum-type solvent). Resistance to the chemicals was then defined by determining the mass change by precisely weighing three times with a precision balance (trademark "Mettler Toledo") and calculating an average value of three measurements shown in Table 1 and Table 2.

(8) Resistance to Rubbing:

This characteristic was measured on aforementioned flat plate C according to JIS L0849 (Color Fastness Test to Rubbing) by applying 5N force perpendicular to the plate surface and performing multiple reciprocating rubbing strokes for a predetermined number of reciprocation cycles (10 cycles, 50 cycles, and 100 cycles) by using white cotton cloth No. 3 (Kanakin No. 3: rubbing cotton cloth) (JIS L0803 Standard Adjacent Fabrics for Staining of Colour Fastness Test). The surface gloss was evaluated before the test and after the rubbing test and then the surface gloss endurance was evaluated by comparing the original surface gloss with the one obtained after the test. Furthermore, the following criteria were used for evaluating visual inspection of the surface of the specimen after a predetermined number of reciprocation cycles: no abrasion observed—"5"; abrasion slightly observed—"4"; abrasion easily observed—"3"; abrasion clearly observed—"2"; significant abrasion—"1". Furthermore, surface roughness of the specimen after a 100-cycle test was measured. The aforementioned test was carried out three times, and the average value of these tests are shown in Table 1 and Table 2.

(9) Surface Gloss:

This property was measured on aforementioned flat plate C prior to and after testing the resistance to rubbing. The gloss was measured in accordance with the provisions of JIS Z8741 (Method of Measuring Mirror Surface Gloss) with an incidence angle of 60° by using micro-TRI-gloss tester (product of BYK Gardner).

(10) Adhesive Properties:

A laminated plate was prepared by applying a layer of adhesive agent only onto an area of 60 mm×25 mm of a glass plate (150 mm×25 mm×5 mm) starting from the edge of the glass plate, then placing the glass plate into a mold and injection molding a thermoplastic elastomer composition onto the adhesive-coated side of the glass plate, thus forming a layer of 150 mm×25 mm×3 mm on top of the glass plate. The obtained laminated plate was tested with regard to adhesion properties by measuring the tensile strength according to JIS K6256 (Adhesive Testing Methods for Vulcanized and Thermoplastic Rubbers) on a tensile tester (the product of Shimazu Seisakusho Co., Ltd, Model AGS-J) with a peeling angle of 180° and at a stretching speed of 200 mm/min. A polyolefin chloride type adhesive agent was used as the adhesive agent.

TABLE 1

| Component Designation (symbol) | Material Designation (symbol) | Practical Example No. 1 | 2 | 3 | 4 | 5 |
|---|---|---|---|---|---|---|
| (1-a) | SBC-1 | 100 | 100 | 100 | 100 | 100 |
| (1-c) | PP | 50 | 50 | 50 | 50 | 70 |
| (1-d) | PPE | 40 | 40 | 40 | 40 | — |
| (Component 1) | Polymer | 100 | 100 | 100 | 100 | 100 |
| (Component 2) | Oil | 68.4 | 68.4 | 68.4 | 68.4 | 123.5 |
| (Component 3) | Calcium Bicarbonate | 73.7 | 73.7 | 73.7 | 73.7 | 8.8 |
|  | Carbon MB | 2.63 | 2.63 | 2.63 | 2.63 | 2.94 |
| (Component 4) | Oleic acid amide | 0.98 | 0.98 | 0.98 | — | 0.94 |
|  | Stearyl stearate | — | — | — | 0.98 | — |
| (Component 5) | (5-a) Copolymer 1 | 3.92 | 3.92 | 3.92 | 3.92 | 3.76 |
|  | (5-b) Silicone powder | — | 4.89 | — | 4.8 | 4.71 |
|  | (5-c) Copolymer 2 | — | — | 4.69 | — | — |
|  | Silicone oil | — | — | — | — | — |
| Properties |  |  |  |  |  |  |
| Hardness |  | 70 | 69 | 73 | 69 | 63 |
| Tensile Strength (MPa) |  | 6.8 | 6.3 | 7.0 | 6.4 | 7.6 |
| 100% Modulus (MPa) |  | 3.0 | 2.7 | 3.1 | 2.7 | 2.0 |
| Elongation (%) |  | 640 | 630 | 610 | 640 | 820 |
| Tear Strength (N/mm) |  | 35 | 35 | 37 | 35 | 27 |
| Permanent deformation at compression (%) |  | 40 | 40 | 39 | 40 | 45 |
| Surface Abrasion-proof Properties of Flat Plate |  | 5 | 5 | 5 | 4 | 5 |
| Surface appearance (after molding) |  | 5 | 5 | 5 | 5 | 5 |
| of the plate (after ageing) |  | 4 | 5 | 5 | 5 | 5 |
| Resistance to Chemicals (mass change rate) (%) |  | — | 27.6 | — | — | — |
| Surface Gloss 10 cycles of rubbing Initial |  | — | 23.7 | — | — | — |
| After test |  | — | 22.7 | — | — | — |
| 50 cycles of rubbing Initial |  | — | 20.3 | — | — | — |
| After test |  | — | 21.5 | — | — | — |
| 100 cycles of rubbing Initial |  | — | 21.2 | — | — | — |
| After test |  | — | 24.5 | — | — | — |
| Visual Inspection of The Surface after Rubbing 10 cycles of rubbing |  | — | 5 | — | — | — |
| 50 cycles of rubbing |  | — | 4 | — | — | — |
| 100 cycles of rubbing |  | — | 4 | — | — | — |
| Adhesive Properties (N/25 mm) |  | — | 272 | — | — | — |

TABLE 2

| Component Designation (symbol) | Material Designation (symbol) | Comparative Example No. 1 | 2 | 3 | 4 |
|---|---|---|---|---|---|
| (1-a) | SBC-1 | 100 | 100 | 100 | 100 |
| (1-c) | PP | 50 | 50 | 50 | 70 |
| (1-d) | PPE | 40 | 40 | 40 | — |
| (Component 1) | Polymer | 100 | 100 | 100 | 100 |
| (Component 2) | Oil | 68.4 | 68.4 | 68.4 | 123.5 |
| (Component 3) | Calcium Bicarbonate | 73.7 | 73.7 | 73.7 | 8.8 |
|  | Carbon MB | 2.63 | 2.63 | 2.63 | 2.94 |
| (Component 4) | Oleic acid amide | — | 0.98 | — | 0.94 |
|  | Stearyl stearate | — | — | — | — |
| (Component 5) | (5-a) Copolymer 1 | — | — | — | — |
|  | (5-b) Silicone Powder | — | — | 4.89 | — |
|  | (5-c) Copolymer 2 | — | — | — | — |
|  | Silicone oil | — | — | 0.98 | — |
| Properties |  |  |  |  |  |
| Hardness |  | 69 | 68 | 67 | 62 |
| Tensile Strength (MPa) |  | 8.4 | 6.7 | 6.5 | 7.4 |
| 100% Modulus (MPa) |  | 3.0 | 2.8 | 2.7 | 1.9 |
| Elongation (%) |  | 720 | 680 | 640 | 850 |
| Tear Strength (N/mm) |  | 37 | 37 | 35 | 27 |
| Permanent deformation at compression (%) |  | 37 | 40 | 39 | 47 |
| Surface Abrasion-proof Properties of Flat Plate |  | 3 | 5 | 3 | 5 |
| Surface appearance (after molding) |  | 5 | 2 | 5 | 2 |
| of the plate (after ageing) |  | 5 | 1 | 4 | 1 |
| Resistance to Chemicals (mass change rate) (%) |  | 32.8 | — | — | — |
| Surface Gloss 10 cycles of rubbing Initial |  | 12.7 | — | — | — |
| After test |  | 4.1 | — | — | — |
| 50 cycles of rubbing Initial |  | 13.6 | — | — | — |
| After test |  | 3.2 | — | — | — |
| 100 cycles of rubbing Initial |  | 15.9 | — | — | — |
| After test |  | 2.4 | — | — | — |

TABLE 2-continued

| Component Designation (symbol) | Material Designation (symbol) | Comparative Example No. | | | |
|---|---|---|---|---|---|
| | | 1 | 2 | 3 | 4 |
| Visual Inspection of The Surface after Rubbing | 10 cycles of rubbing | 3 | — | — | — |
| | 50 cycles of rubbing | 2 | — | — | — |
| | 100 cycles of rubbing | 2 | — | — | — |
| Adhesive Properties (N/25 mm) | | 230 | — | — | — |

It can be seen from comparison of Practical Examples with Comparative Example 1 that the thermoplastic elastomer composition of the present invention that contains the higher fatty acid derivative (4) and the additive (5) is superior to the composition without these components with regard to abrasion-proof properties. Comparison between Practical Example 2 and Comparative Example 1 shows that the presence of the aforementioned components (4) and (5) significantly improves abrasion-proof properties.

Comparison of any Practical Example with Comparative Example 2 shows that the thermoplastic elastomer composition of the present invention that contains the higher fatty acid derivative (4) and the additive (5) is superior to the composition without these components with regard to tackiness on the surfaces of products and has better properties required for exterior design.

Comparison of any Practical Example with Comparative Example 3 shows that the thermoplastic elastomer composition of the present invention that contains the higher fatty acid derivative (4) and the additive (5) has better abrasion-proof properties than the thermoplastic elastomer composition where the higher fatty acid derivative is replaced by silicone oil.

Comparison of Practical Example 1 with Practical Examples 2, 4, and 5 shows that addition of the polyorganosiloxane cross-linked powder (5-b) to the thermoplastic elastomer composition of the invention that contains the higher fatty acid derivative (4) and the vinyl polymer graft-olefin polymer (5-a) provides long-term protection of the product surface from development of tackiness and from the loss of properties required for exterior design.

Comparison between Practical Examples 1 and 3 shows that addition of the polyorganosiloxane graft-olefin polymer (5-c) to the thermoplastic elastomer composition of the invention that contains the higher fatty acid derivative (4) and the vinyl polymer graft-olefin polymer (5-a) provides long-term protection of the product surface from development of tackiness and from the loss of properties required for exterior design.

Comparison between Practical Examples 4 and 2 shows that the use of a fatty acid amide as a higher fatty acid derivative (4) provides further improvement in abrasion-proof properties as compared with the composition where the higher fatty acid derivative (4) is represented by a fatty acid ester.

| [Reference Numerals Used in the Specification] | |
|---|---|
| 1 | glass panel molding assembly |
| 2 | glass panel |
| 2A | exterior surface of the glass panel |
| 2B | interior surface of the glass panel |
| 2C | end face of the glass panel |
| 3 | molding |
| 4 | adhesive layer |

INDUSTRIAL APPLICABILITY

Since the thermoplastic elastomer composition of the invention is suitable for producing molded products that are characterized by excellent abrasion-proof properties and have attractive appearance free of surface tackiness that is detrimental to exterior design characteristics, the composition may find wide application in the industry, in particular for the manufacture of vehicle moldings that require good balance between various properties. The product produced from the composition of the invention is suitable for manufacturing of moldings not only for such vehicles as cars and trains but also for ships, as well as for units of amusement equipment, etc.

The invention claimed is:

1. A thermoplastic elastomer composition comprising: a polymer component (1) that comprises 100 parts by mass of a styrene thermoplastic elastomer, 5 to 150 parts by mass of a polyolefin polymer {except for the additives in item (5) below}, and 5 to 150 parts by mass of a polyphenylene ether polymer, provided that the sum of the polyolefin polymer and the polyphenylene ether polymer are less than or equal to 150 parts by mass; 10 to 200 parts of a non-aromatic-rubber softener (2) by mass per 100 parts by mass of said polymer component (1); a derivative of fatty acids that contain 8 to 30 carbon atoms, except for carbon atoms of carbonyl groups in an amount of 0.01 to 10 parts by mass per 100 parts by mass of said polymer component (1); and at least one additive (5) used in an amount of 1 to 20 parts by mass per 100 parts by mass of said polymer component (1) and selected from the following:
   (5-a) a vinyl polymer graft-olefin polymer;
   (5-b) a polyorganosiloxane cross-linked powder; and
   (5-c) a polyorganosiloxane graft-olefin polymer.

2. The thermoplastic elastomer composition according to claim 1, further comprising an inorganic filler (3).

3. The thermoplastic elastomer composition according to claim 2, wherein the amount of said inorganic filler (3) is 5 to 250 parts by mass per 100 parts by mass of said polymer component (1).

4. The thermoplastic elastomer composition according to claim 1, wherein said styrene thermoplastic elastomer comprises hard blocks consisting essentially of styrene monomer units and soft blocks consisting essentially of conjugated diene monomer units and wherein said soft blocks consist essentially of butadiene units and/or isoprene units.

5. The thermoplastic elastomer composition according to claim 1, wherein said polyolefin polymer comprises a polypropylene or a propylene-ethylene copolymer.

6. The thermoplastic elastomer composition according to claim 1, wherein said polyphenylene ether polymer has an intrinsic viscosity from 0.08 to 0.90 g/dl.

7. The thermoplastic elastomer composition according to claim 1, wherein said polyphenylene ether polymer comprises poly(2,6-dimetyl-1,4-phenylene ether).

8. The thermoplastic elastomer composition according to claim 1, wherein said non-aromatic-rubber softener (2) comprises a paraffin process oil.

9. The thermoplastic elastomer composition according to claim 2, wherein said inorganic filler (3) comprises calcium bicarbonate and/or talc.

10. The thermoplastic elastomer composition according to claim 1, wherein said derivative of fatty acids comprises a fatty acid amide and/or a fatty acid ester.

11. A thermoplastic elastomer composition comprising: a polymer component (1) that comprises 100 parts by mass of a styrene thermoplastic elastomer and 5 to 150 parts by mass of a polyolefin polymer {except for the additives in item (5-a) below}; 10 to 200 parts of a non-aromatic rubber softener (2) by mass per 100 parts by mass of said polymer component (1); a derivative of fatty acids that contain 8 to 30 carbon atoms, except for carbon atoms of carbonyl groups, in an amount of 0.01 to 10 parts by mass per 100 parts by mass of said polymer component; a vinyl polymer graft- olefin polymer (5-a) in an amount of 1 to 20 parts by mass per 100 parts by mass of said polymer component; and a polyorganosiloxane cross-linked powder (5-b) in an amount of 1 to 20 parts by mass per 100 parts of said polymer component.

12. A glass panel molding assembly for a vehicle, wherein a molding is integrally connected through a layer of an adhesive agent to a peripheral edge portion of a glass panel and wherein said molding is a product produced from a thermoplastic elastomer composition comprising a polymer component (1) that comprises 100 parts by mass of a styrene thermoplastic elastomer, 5 to 150 parts by mass of a polyphenylene ether polymer, and 5 to 150 parts by mass of a polyolefin polymer {except for the additives in item (5) below}; 10 to 200 parts of a non-aromatic rubber softener (2) by mass per 100 parts by mass of said polymer component (1); a derivative of fatty acids that contain 8 to 30 carbon atoms (except for carbon atoms of carbonyl groups) (4) in an amount of 0.01 to 10 parts by mass per 100 parts of the polymer component; and at least one additive (5) used in an amount of 1 to 20 parts by mass per 100 parts by mass of the polymer component and selected from the following:

(5-a) a vinyl polymer graft-olefin polymer;
(5-b) a polyorganosiloxane cross-linked powder; and
(5-c) a polyorganosiloxane graft-olefin polymer.

13. The thermoplastic elastomer composition according to claim 11, further comprising an inorganic filler (3).

14. The glass panel molding assembly for a vehicle according to claim 12, wherein the thermoplastic elastomer composition further comprises an inorganic filler (3).

* * * * *